Dec. 30, 1930.   A. E. KRAMER ET AL   1,786,954
GAS VALVE LOCK
Filed March 15, 1929
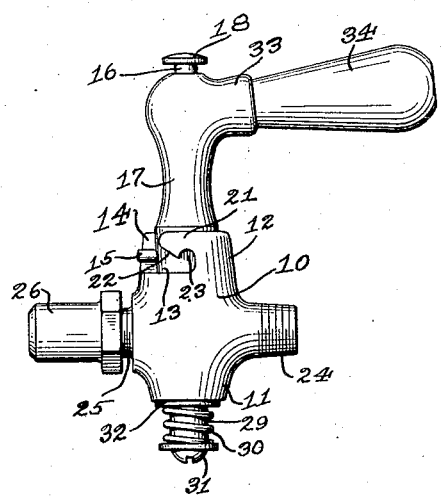
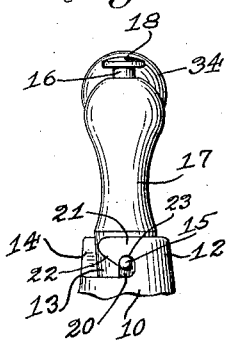
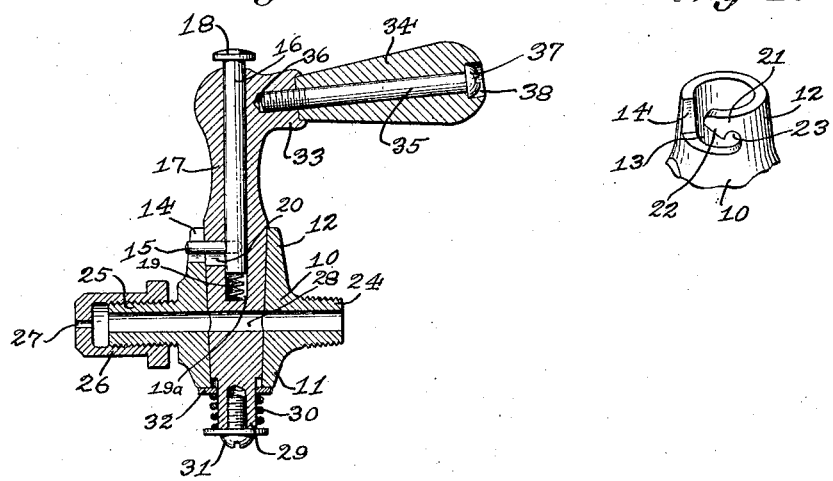
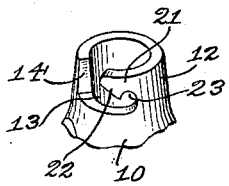
INVENTORS
Arthur E. Kramer,
John W. Platt.
BY H. G. Manning
ATTORNEY Patented Dec. 30, 1930

1,786,954

UNITED STATES PATENT OFFICE

ARTHUR E. KRAMER AND JOHN WHITE PLATT, OF WATERVILLE, CONNECTICUT

GAS-VALVE LOCK

Application filed March 15, 1929. Serial No. 347,239.

This invention relates to gas valves, and more particularly to a safety attachment for automatically locking the valve when it has been turned off.

One object of this invention is to provide a safety locking attachment of the above nature comprising a valve plug having a manually depressible releasing plunger which must be operated to permit the valve to be opened.

A further object of this invention is to provide a gas valve casing having a wedge slot for automatically interlocking with a pin on the valve plug plunger when the handle is swung to the "off" position.

A further object is to provide a device of the above nature which will be simple in construction, inexpensive to manufacture, easy to manipulate, compact, ornamental in appearance, and very efficient and durable in use.

With these and other objects in view there has been illustrated on the accompanying drawings one form in which the invention may be conveniently embodied in practice.

Fig. 1 represents a side view in elevation of the gas valve shown in open position.

Fig. 2 is a fragmentary end view of the same.

Fig. 3 is a vertical side sectional view of the same.

Fig. 4 is a fragmentary perspective view of the upper portion of the valve body showing the pin locking slot in its upper periphery.

Referring now to the drawings in which like reference numerals denote corresponding parts throughout the several views, the numeral 10 indicates a valve body formed substantially in the shape of a T and having an enlarged tapered bottom leg 11 and a similarly enlarged tapered upper leg 12. The leg 12 is cut away in its top edge to form a depending slot 13, said slot having a vertical shoulder 14 at its left-hand end, as viewed in Fig. 4, to form a stop for a pin 15 mounted on a depressible rod or plunger 16 slidably located within a hollow valve plug 17.

The upper end of the rod 16 is provided with a manually-operable cap 18 preferably rounded on its upper surface, and said rod 16 is adapted to be pressed upwardly at all times by a helical spring 19 seated in a socket 19a in the plug 17, as shown in Fig. 3. A lateral opening 20 is provided in the plug 17 to permit the pin 16 to have a limited "up and down" movement with respect to said plug.

In order to retain the pin 15 in closed position, the slot 13 is provided at its right-hand end, as viewed in Figs. 1, 2, and 4, with an overhanging undercut wedge-shaped projection 21 having a flat top surface flush with the top of the leg 12. The projection 21 has a wedge-shaped downwardly inclined bottom edge 22 adjoining which is a circular downwardly opening recess 23. By means of this construction, when the valve is moved to closed position, the pin 15 will be depressed against the action of the spring 19 by the wedge-shaped edge 22 and then caused to snap upwardly into the recess 23.

The valve body 10 includes the usual horizontal threaded pipe sections 24 and 25, the latter having a nozzle member 26 screwed thereon. The nozzle 26 has the usual small opening 27 in its end for regulating the flow of gas.

The valve plug 17 has the usual transverse passage 28 near its lower end adapted to lie in alinement with the central passages in the pipe sections 24 and 25 when the valve is in open position. The plug 17 has a reduced cylindrical bottom section 29, surrounding which is a helical spring 30, the latter being held between a headed set screw 31 at its lower end and a washer 32 engaging the leg 11 at its upper end.

In order to manipulate the valve, the plug 17 has at its upper end an offset socket 33 to which a handle 34 is detachably connected, as by a bolt 35. The threaded end of the bolt 35 is secured in a recess 36 in the socket 33, while the head 37 of said bolt is seated within a recess 38 at the outer end of the handle 34.

In operation, assuming the valve to be in closed position, when it is desired to turn on the gas, it will only be necessary for the user to push down upon the cap 18, depressing the rod 16 and pin 15, and disengaging the pin 15 from the circular recess 23 below the locking wedge-shaped projection 21.

The handle 34 may then be swung in a clockwise direction from the position shown in Fig. 2 to the position shown in Fig. 1, until the pin 15 strikes the stop shoulder 14, at which time the passage 28 will be in alinement with the passages in the pipe members 24 and 25 at the sides of the casing.

When it is desired to turn off the gas, it will be unnecessary to again depress the cap 18, but the handle 33 need only be swung in a counter-clockwise direction, forcing the pin 15 to automatically ride under the downwardly inclined edge 22 and thereafter to snap upwardly into the recess 23.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a gas valve cock, a casing, a valve plug fitting within said casing, a transverse handle secured to said plug, a depressible plunger slidably mounted within said plug and carrying a laterally extending locking pin near its lower end, said casing having an open slot in its upper edge for detachably interlocking with said pin when the valve is closed, a spring pressing upwardly upon said plunger to cause said pin to snap into said slot automatically during the closing of said valve, said plunger having a manipulating knob extending above the top of said plug, said locking slot having an enlarged seat and an inclined wedge-shaped section to depress said pin during the closing of the valve whereby the moving of said handle will cause said pin automatically to pass over said wedge section and to snap into said seat.

2. In a gas valve cock, a casing, a valve plug fitting within said casing, a transverse handle secured to said plug, a depressible plunger slidably mounted within said plug and carrying a laterally extending locking pin near its lower end, said casing having an open slot in its upper edge for detachably interlocking with said pin when the valve is closed, and a spring pressing upwardly upon said plunger to cause said pin to snap into said slot automatically during the closing of said valve, said plunger having a manipulating knob extending above the top of said plug, the upper portion of said locking slot having a pin-depressing wedge and a circular undercut recess at its end for fitting about said locking pin.

3. In a gas valve cock, a casing, a valve plug fitting within said casing, a transverse handle secured to said plug, a depressible plunger slidably mounted within said plug and carrying a laterally extending locking pin near its lower end, said casing having an open slot in its upper edge for detachably interlocking with said pin when the valve is closed, and a spring pressing upwardly upon said plunger to cause said pin to snap into said slot automatically during the closing of said valve, said plunger having a manipulating knob extending above the top of said plug, said locking slot having an inclined wedge-shaped undercut upper edge and a circular recess at its end for fitting about said locking pin.

4. In a gas valve cock, a casing, a valve plug fitting within said casing, a transverse handle secured to said plug, a depressible plunger slidably mounted within said plug and carrying a laterally extending locking pin near its lower end, said casing having an open slot in its upper edge for detachably interlocking with said pin when the valve is closed, and a spring pressing upwardly upon said plunger to cause said pin to snap into said slot automatically during the closing of said valve, said plunger having a manipulating knob extending above the top of said plug, said locking slot having a downwardly inclined wedge-shaped upper edge to depress said pin during the closing of the valve.

5. In a gas valve cock, a casing, a valve plug fitting within said casing, a transverse handle secured to said plug, a depressible plunger slidably mounted within said plug and carrying a laterally extending locking pin near its lower end, said casing having an open slot in its upper edge for detachably interlocking with said pin when the valve is closed, and a spring pressing upwardly upon said plunger to cause said pin to snap into said slot automatically during the closing of said valve, said plunger having a manipulating knob extending above the top of said plug, said locking slot having an inclined wedge shaped undercut upper edge and a downwardly opening circular recess at its end for fitting about said locking pin.

6. In a gas valve cock, a casing, a hollow valve plug in said casing having a manipulating handle, an upwardly spring-pressed plunger slidably mounted within said plug, said plunger carrying a laterally extending locking pin near its lower end, said casing having an open slot cut in its upper edge within which said locking pin is adapted to move, one end of said slot having a vertical shoulder to limit the swing of said pin during the opening of the valve, the other end of said slot having an overhanging laterally-extending wedge-shaped pin-depressing projection, said slot having a curved recess under the base of said projection for detachably receiving and holding said locking pin when the valve is closed.

In testimony whereof, we have affixed our signatures to this specification.

JOHN WHITE PLATT.
ARTHUR E. KRAMER.